Dec. 20, 1966 R. J. ROJIC 3,292,875

NON-REWIND FILM OR DATA TAPE APPARATUS

Filed April 1, 1964

INVENTOR
Raymond J. Rojic
BY Gustave Miller
ATTORNEY

United States Patent Office 3,292,875

Patented Dec. 20, 1966

3,292,875

NON-REWIND FILM OR DATA TAPE APPARATUS

Raymond J. Rojic, 900 Spring Road, Elmhurst, Ill. 60126

Filed Apr. 1, 1964, Ser. No. 356,515
9 Claims. (Cl. 242—55.21)

This invention relates to a non-rewind film or data tape apparatus, and has for an object to provide an improved apparatus for use with movie film or television or other data recording tape whereby the film or tape coming from the film or tape drum on the feed support of the reproducer, such as a projector or record player, is coiled into a similar drum mounted on the takeup support in such a manner that it is immediately again ready for reproducing without the necessity of being rewound or recoiled.

A further object of this invention is to provide an apparatus that will eliminate the customary necessity of rewinding film or data tape when it has been projected or reproduced, but which will leave the film or tape in proper position for immediate reuse without the necessity of rewinding the same.

A further object of this invention is to provide an apparatus enabling the film or data tape to be immediately reused, and to provide such an apparatus that may be incorporated in any reproducing machine, such as a movie projector or a television or recording tape reproducer, as initially manufactured, or which may be added to most existing reproducing machines with but minor modifications.

A further object of this invention is to completely eliminate all rewinding of recording film or data tape, which will place the film or tape in proper recoiled position for immediate reuse.

Still a further object of this invention is to provide a non-rewind film apparatus (the term "film" as hereinafter used including all types of film or data tape used for recording and reproducing all sorts of data, such as movie film with pictures and/or sound, tape for all sorts of recorded data, whether television, sound or other types of recordable data) which, when the film has been run through a reproducing apparatus (such as a movie projector or other type of data reproducing apparatus) automatically recoils the film so that it is immediately ready for reproduction at any time.

A further object of this invention is to provide a non-rewind film or data tape apparatus that is usable with any type of data tape reproducing apparatus, although, for the sake of illustration, it is here disclosed as used in connection with a movie film projector.

With the foregoing and other objects in view, this invention as hereinafter described in the following specification will become apparent when read in conjunction with the accompanying drawing, in which.

Figures 1, 2, 3, 4, 5, 6:
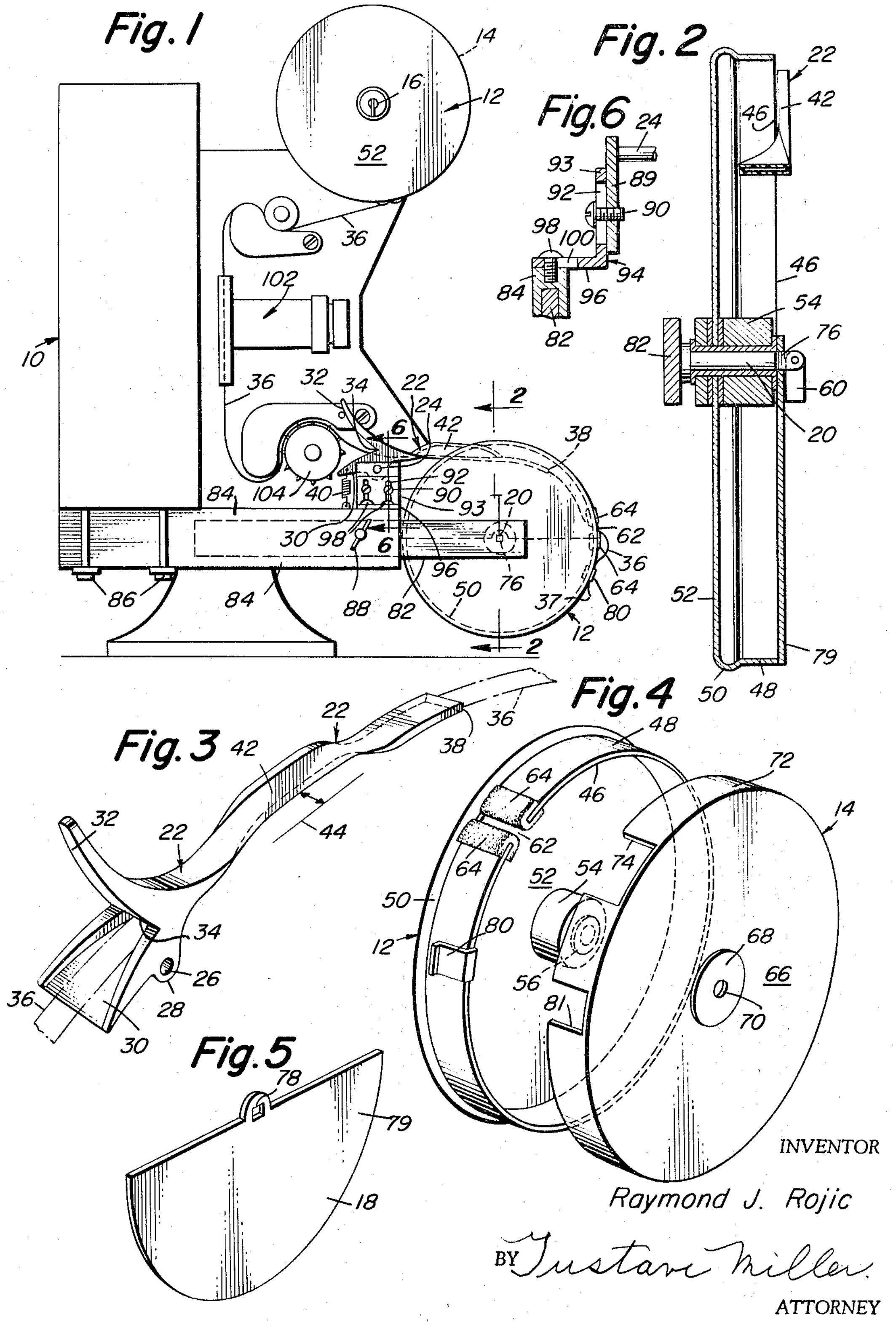
FIG. 1 is an elevational view of the invention as used in connection with a movie film reproducer or projector.
FIG. 2 is a sectional view on line 2—2 through the cannister or drum in which the film or data tape is recoiled and stored, ready for reuse.
FIG. 3 is a perspective view of the flattened film guide tube.
FIG. 4 is an exploded view of the cannister or drum with the film coil retaining means used thereon when on the receiving spindle, and, exploded therefrom, the film coil drum or cannister cover used when on the feed support of the reproducer.
FIG. 5 is a perspective view, per se, of the film coil retaining shield used on the drum in takeup position.
FIG. 6 is a vertical section on line 6—6 of FIG. 1.

There is shown at 10 a conventional movie film or data tape reproducer or projector as slightly modified and used in combination with the non-rewind film or tape apparatus of this invention. The apparatus of this invention includes two substantially identical cannisters or drums 12, as shown in perspective in FIG. 4, one coil retaining cover 14 being used on the cannister or drum when on the feed support 16, one film coil retaining shield 18 being used on the cannister or drum when on the takeup support 20, and one flattened and twisted film guide tube 22 being pivotally mounted on a pivot 24 on the sleeve 84 on the projector 10. The pivot 24 extends through a pivoting shaftway 26 provided in a boss 28 formed on the outside of one converging lip 30. Another converging lip 32, together with the lip 30, together lead toward a mouth 34 to a passageway through which the film or data strip 36 passes between the mouth 34 and the discharge end 38 of the guide tube 22.

A spring 40 secured at one end to lower tube lip 30 and at its other end to the outside of sleeve 84, biases the discharge end 38 upwardly to discharge the film or data tape 38 passing therethrough on the inner side of the coil that it forms within the cannister or drum 12 placed on the takeup spindle 20, as will hereinafter become apparent.

Intermediate the discharge end 38 and the entrance mouth 34, the tube 22, preferably made of a suitable smooth, high hard impact plastic, is twisted in either direction to a plane at right angles to the plane of the passageway at the entrance mouth 34 and discharge end 38, this intermediate vertical portion 42 also being displaced slightly to one side of the vertical projection of the side edge of the tube from the opposite substantially aligned side ends of the tube at 44. As a result, the tube 22, at its intermediate portion 42, causes the film 36 to bypass the free edge 46 of a peripheral cylindrical wall 48 which extends from an offset or beaded edge 50 of a drum or cannister single wall 52 mounted on a drum hub 54, the hub 54 being provided with a shaftway 56 by means of which it is mounted on the feed support 16 or the takeup support 20 and secured thereon by the usual pivoted retaining finger 58 or 60.

The cylindrical wall 48 of the drum 12 is provided with a film exit slot 62 on each side of which there is secured a soft piece 64 of cloth or other suitable fabric or material to wipe off and clean both sides of the film or data tape 36 as it emerges from the drum 12 nonrotatably mounted on the feed support 16. The coil of film or data tape 36 within the drum 12 on feed support 16 is held or retained therein by the film retaining cover 14. This cover 14 consists of a single circular wall 66 having a reinforcing shaftway reinforcing disc 68 apertured at 70 at its center for mounting on the feed support 16 against the drum hub 54, and also having a cylindrical flange 72 for fitting over the drum cylindrical wall 48. The flange 72 has a slot 74 complementary to the slot pieces 64 about the slot 62 of the drum cylindrical wall 48. This retaining cover 14 is used only on the drum 12 on the feed support 16. The takeup support 20 is spindle-shaped so that the takeup drum hub 54 may rotate thereon, but has a squared or non-circular end for receiving a complementary aperture 78 on the semicircular disc-shaped shield 18 to support the shield thereon with its edges overlapping the free edge 46 of the takeup drum cylindrical wall 48.

The film retaining cover 14 has a film or tape front end holding clip 80 on the outside of its flange 72 adjacent the slot 74 to hold the end of the film coil therein in place when the cover 14 has been placed on the drum 12 after the retaining coil shield 18 has been removed, when the drum is removed from the takeup reel 20 either for storage, or for immediate use on the feed support 16. A slot 81 in cover flange 72 is complementary to clip 80. The takeup support 20 is mounted on a bar 82 slidably adjustable in a sleeve 84 which is secured, by any suitable means such as stud bolts 86, to the projector 10, the bar being held in adjusted position as by a winged set screw 88.

The guide tube supporting pivot 24 extends horizontally from a vertical arm 89 adjustably supported by stud screws 90 extending through vertically parallel slots 92 in the vertical leg 93 of an L bar 94 whose horizontal leg 96 is similarly secured by stud screws 98 through parallel slots 100 into the sleeve 84 secured, as already pointed out, by bolts 86 to the projector 10.

The pivot 24 is so adjusted with relation to the biasing spring 40 that the guide tube mouth 34 and the guide tube discharge end 38 are in substantially the same horizontal plane at the beginning of the takeup process.

In operation, the drum 12 containing the coil of film or data tape 36 with the film or tape retaining cover 14 in position thereon, with its flange 72 fitting frictionally against the drum beaded edge 50 is non-rotatably mounted on the feed support 16, with the slots 72 and 74 in appropriate position to feed the film through the conventional reproducing head mechanism, shown generally at 102 and thence to the mouth 34 between the lips 30 and 32 and into the passageway in the guide tube 22. The other duplicate cannister or drum 12 is rotatably mounted on the takeup 20, with coil retaining shield 18 in position. In both cases, the drums 12 on the projector having their single side walls 52, as seen in FIG. 1 toward the viewer, and the cylindrical walls 48 extend away from the viewer, as will be apparent from FIG. 2. The film follows the passageway through the flattened, twisted guide tube 22, twisting to pass through the intermediate portion 42 and thus bypass the free edge 46 of the drum 12 on the takeup support 20, and then twisting back to a position completely within drum 12 in the takeup position. The front end 37 of the film or data tape 36 is then extended through slot 62 between the cleaning fabrics 64, and temporarily secured in the clip 80. Then, as the film or tape is fed through the guide tube 22 by the sprocket 104, the front end 37 thereof pushes against the clip 80 causing the takeup drum or cannister 12 to rotate on its spindle-shaped takeup support 20, which itself is non-rotating and thus supports the shield 18. As the takeup drum 12 is rotated, the coil forms in a spiral toward the takeup drum hub 54, the vertical intermediate portion 42 of the guide tube 22 not only bypassing the edge 46 of cylindrical wall 48, but also bypassing the edge of the coil being formed and serving to retain the upper portion of the coil within the drum 12 while the lower portion of the coil is held therewithin by the shield 18. The converging lips 30 and 32 take care of and overcome any tendency of the incoming film or tape to buckle. The width of the wall 48 is sufficient to keep the coil entirely within the drum 12 just free of contact from either the shield 18 on the takeup spindle support 20 or free from contact with the cover 14 when on the feed support 16.

When the reproduction is completed, the coil of film or tape will then be located completely within the drum 12 on the takeup spindle 20. This drum 12 is then removed from the spindle, the retaining shield 18 is removed and replaced by the cover 14 from the previous feed drum 12. The coil of film or tape is then ready either for storage, or for immediate reuse by placing it on the feed support and removing the empty drum therefrom to the takeup spindle 20 and placing the coil retaining shield 18 thereon. The projection cycle may then be immediately repeated, without the usual rewinding of the film as necessary without this invention.

Although this invention has been described in considerable detail, such description is intended as being illustrative rather than limiting, since the invention may be variously embodied, and the scope of the invention is to be determined as claimed.

Having thus set forth the nature of this invention, what is claimed is:

1. A non-rewind film or data tape apparatus comprising a pair of similar film or data tape coil receiving drums, each drum comprising a hub for mounting the drum on either the feed support or the takeup support of a reproducer, a single side wall mounted on each said hub, and a peripheral cylindrical wall having one free edge and having its other edge secured on said side wall, said cylindrical wall having a transverse slot through which the front end of the film or data tape extends and exits from the drum, means for retaining a coil of film or data tape within each said drum while on said feed and takeup supports, and a film or data tape guide tube receiving the film or data tape coming from the drum on the feed support through the reproducer and guiding it into the drum on the takeup support, said guide tube being a flattened hollow tube substantially horizontal at both its ends and twisted gradually to a vertically extending portion intermediate of its ends, said vertically extending intermediate portion being in a plane horizontally displaced to the outside of one side of the vertical projection of the adjacent edge of the substantially aligned ends of said guide tube to thereby bypass the free edge of the drum on the takeup support.

2. The apparatus of claim 1, and a film or data tape front end temporary securing means on the outside of said cylindrical wall adjacent said slot.

3. The apparatus of claim 1, said coil retaining means for the drum on the feed support comprising a drum cover consisting of a wall and a cylindrical flange thereon removably fitting over the drum cylindrical wall, said cylindrical flange having a slot through which the film or data tape may exit from the drum.

4. The apparatus of claim 1, said coil retaining means for the drum on the takeup support consisting of a less than circular shield and means for removably mounting said shield on the takeup support.

5. The apparatus of claim 4, said shield comprising a semi-circular disc overlapping the free edge of the takeup drum.

6. The apparatus of claim 1, and film or data tape cleaning means mounted on the cylindrical wall of each said drum on both sides of the exit slot to clean the film or data tape as it emerges through said exit slot when the drum is mounted on the feed support.

7. The apparatus of claim 1, said tube having an entrance mouth having lips converging toward said mouth, the plane of the flat passageway through said tube at both its ends extending substantially horizontally thereof.

8. The apparatus of claim 7, and means for yieldably pivotally mounting said tube on a reproducer comprising a boss on one lip of said tube mouth, pivot means cooperating with said boss mounting said boss on the reproducer, and yieldable means biased between the entrance mouth of said tube and the reproducer biasing the exit end of said tube upwardly toward the inner side of the drum cylindrical wall.

9. The apparatus of claim 8, and means adjustably mounting said pivot means both horizontally and vertically.

References Cited by the Examiner

UNITED STATES PATENTS

| | | | |
|---|---|---|---|
| 1,134,664 | 4/1915 | Bingham | 242—55.21 |
| 1,460,435 | 7/1923 | Newman | 242—55.13 |
| 1,551,037 | 7/1925 | Lube | 242—55.21 X |
| 2,182,723 | 12/1939 | Feller | 242—55.21 |
| 2,495,344 | 1/1950 | Proch | 242—55.21 X |
| 2,608,357 | 7/1952 | Brearton | 242—76 |
| 3,153,517 | 10/1964 | Blank et al. | 242—55.21 |

FOREIGN PATENTS

| | | |
|---|---|---|
| 210,878 | 2/1924 | Great Britain. |

STANLEY N. GILREATH, *Primary Examiner.*

FRANK J. COHEN, B. S. TAYLOR, *Assistant Examiners.*